Oct. 26, 1971    J. J. MROSS    3,615,036

LOCKING FILLER CAP

Original Filed Oct. 17, 1968    3 Sheets-Sheet 1

Inventor:
John J. Mross
John W. Isaine
Atty.

Inventor:
John J. Mross
John W. Gaines
Atty.

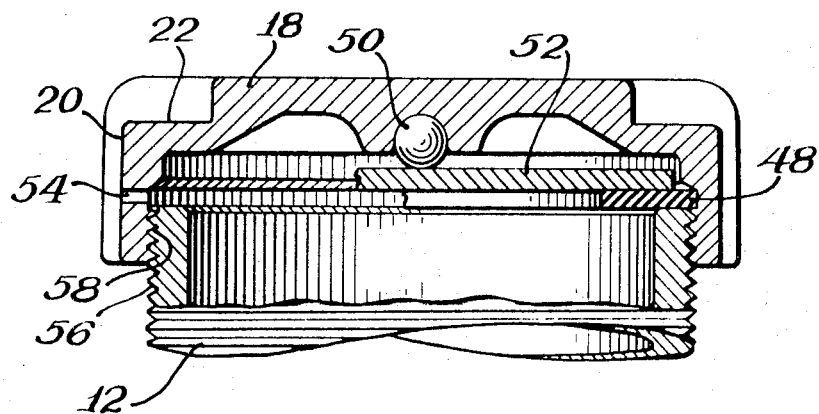
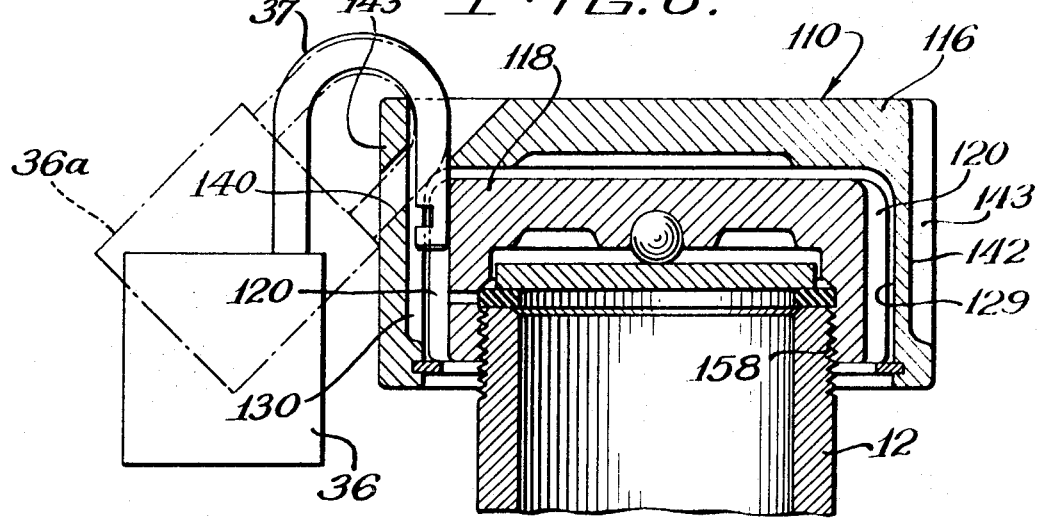

United States Patent Office 3,615,036
Patented Oct. 26, 1971

3,615,036
LOCKING FILLER CAP
John J. Mross, Chicago, Ill., assignor to International Harvester Company, Chicago, Ill.
Original application Oct. 17, 1968, Ser. No. 768,262, now Patent No. 3,537,283, dated Nov. 3, 1970. Divided and this application Mar. 16, 1970, Ser. No. 19,583
Int. Cl. B65d 41/04
U.S. Cl. 220—39
3 Claims

ABSTRACT OF THE DISCLOSURE

A three-piece locking cap with disconnecting drive, which cap is adaptable to two uses or functions and which includes a filler cap, a separable outer cap, and drive establishing means such as a locking pin having padlock openings therein. The cap has a non-locked closure function provided by the filler cap only, and an interrupter type locking function when the outer cap and locking pin are applied to the filler cap. The pin is selectively moved into drive establishing position of interengagement between the caps, or padlocked to the outer cap in a drive interrupter or disconnecting position.

---

This application is a division of Ser. No. 768,262 filed Oct. 17, 1968, now Pat. No. 3,537,283.

This invention relates to a tank locking cap assembly with disconnecting drive and, more particularly, to an assembly of inner and outer caps threadably received on the filler pipe of a tank and effective to be unscrewed therefrom when a drive establishing interposed pin interengages the caps. To prevent cap removal, the drive is disconnected by disengaging the pin from one of the two caps and padlocking the pin out of the interposed position so as to keep it disengaged.

Caps for the fuel tanks of vehicles, for example, are offered in one category as a simple filler cap affording no protection against unwarranted removal, and are offered in another category as a locking or so-called protector cap requiring unlocking for removal. The practice is to make the two categories of cap according to separate designs, and it is therefore the further practice to provide for no common parts and for no interchangeability thereamong.

The simple filler cap or inner cap is basic to the design according to my invention, with nothing sacrificed and yet with the filler cap design rendering it usable selectively as a simple cap or as the inner cap part of a protector cap assembly, as will now be explained in detail.

Features, objects, and advantages will either be specifically pointed out or become apparent when, for a better understanding of my invention, reference is made to the following description taken in conjunction with the accompanying drawings which show certain preferred embodiments thereof, and in which:

FIGS. 4 and 5 are top plan and longitudinal elevational sectional views of my invention utilized as a simple filler cap; and FIG. 6 is a longitudinal elevational sectional view of a modified assembly utilizing a dual function filler cap embodying my invention.

Figure 1:
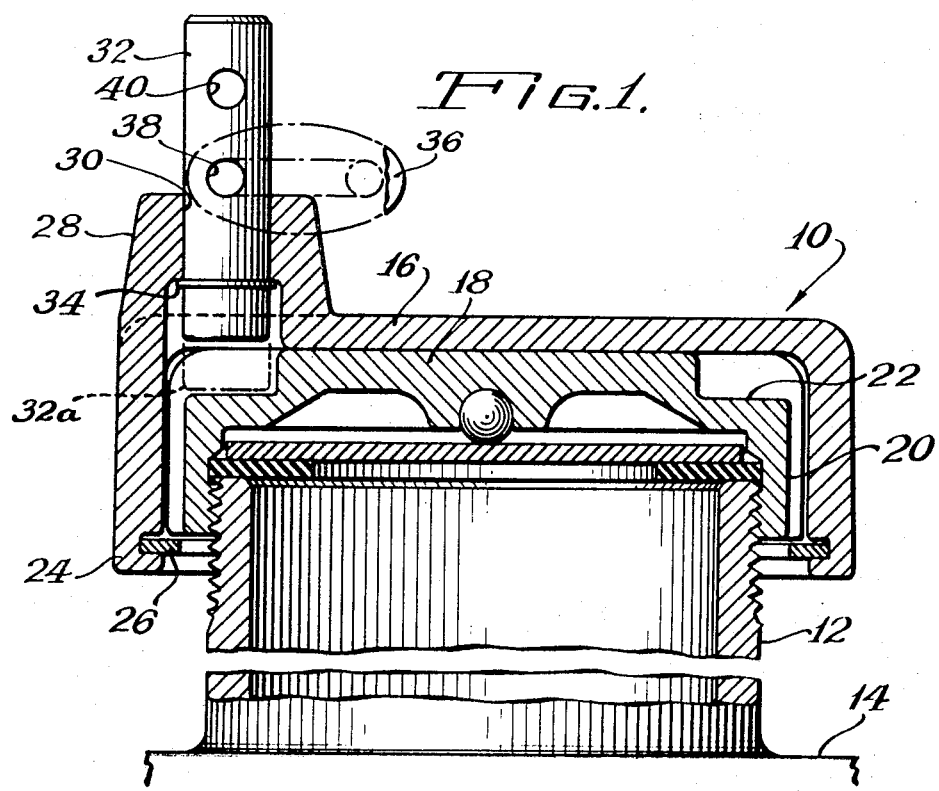
FIG. 1 is a longitudinal elevational view in cross section of my invention in its usage in a protector cap assembly on a tank.

More particularly, a cap assembly 10 is shown installed, in FIG. 1 of the drawings, in a position on the filler pipe neck 12 of a tank 14 which holds fuel for, and which is mounted on, a vehicle such as an off-the-road rubber tired vehicle or track type vehicle. The parts of the assembly include relatively rotatable outer and inner caps 16 and 18, the inner one 18 of which is a simple, screw-on filler cap.

The filler cap 18 has a lower series of external finger scallops 20 arranged in a cylindrical row thereabout and an upper series of external finger scallops 22 arranged in a radial ring in the plane of and about the top of the cap.

The open end 24 of the outer cap 16 is prolongated so as to extend slightly past the corresponding end of the filler cap 18 and is removably secured thereto by means of a snap ring 26 carried in a circular groove 27 (FIG. 3) located inside of the mouth of the end 24 and slightly inwardly offset with respect thereto. A single hollow boss 28 integrally projects upwardly from the periphery of the outer cap 16 and is formed with a vertical opening 30 in which it slidably receives and guides a vertically disposed locking pin 32.

It will be appreciated that the guide boss 28 is vertically aligned with the outermost periphery of the filler cap 18 and, when it registers with and interengages the selected scallop 22, it will transmit maximum leverage into the screw-on filler cap 18, both for applying it to and for removing it from the filler neck 12.

When grasped at the upper end, the pin 32 is operatively moved between an advanced, drive establishing broken line position as shown by the broken lines 32a in FIG. 1 in which the upper end of the pin protrudes and the lower inner end of the pin interengages with the walls of a selected one of the upper scallops 22, and a locked upwardly displaced position as shown in solid lines in which the pin protrudes a materially greater extent upwardly above the boss 28. A snap ring 34 encircling the lower internal end of the pin 32 prevents its unwanted removal from the outer cap 16 of the assembly and, in the locked upwardly displaced position of the pin, the snap ring 34 interengages the interior underside of the boss 28 by seating on the base portion of the hollow interior. Also in the locked displaced position, the pin 32 is locked with a padlock 36, the U-shaped shackle of which is received in the lower opening 38 of two vertically aligned padlock openings 38 and 40 each disposed transversely in the upper outer portion of the pin. The padlock shackle interengages with the top outside of the boss 28 and prevents the pin from unwantedly advancing into the drive-establishing position which would interengage both cap 16 and 18 for conjoint rotation.

The upper shackle-receiving opening 40 is a storage opening by which the pin 32 carries the lock 36 when the lock is stored against loss while the cap assembly 10 is in drive establishing relation.

In use of the cap assembly to accommodate filling the tank 14, the padlock 36 is changed from the lower lock opening 38 and relocked in the storage opening 40; the pin 32 falls into the first scallop 22 with which it registers upon slight manual rotation one way or the other of the outer cap 16. Counterclockwise rotation of the outer cap 16 by hand causes the filler cap 18 to rotate therewith and the assembly is unscrewed and removed as a unit from the neck 12. The tank 14 is filled, and the assembly 10 is then replaced by hand by a reverse process screwing it down. Thereafter, the padlock 36 is removed, the pin 32 is grasped at its outer end and lifted from the advanced drive establishing position into the displaced position, and is locked in the latter position with the padlock 36 locked in the lower lock opening 38.

Figure 2:
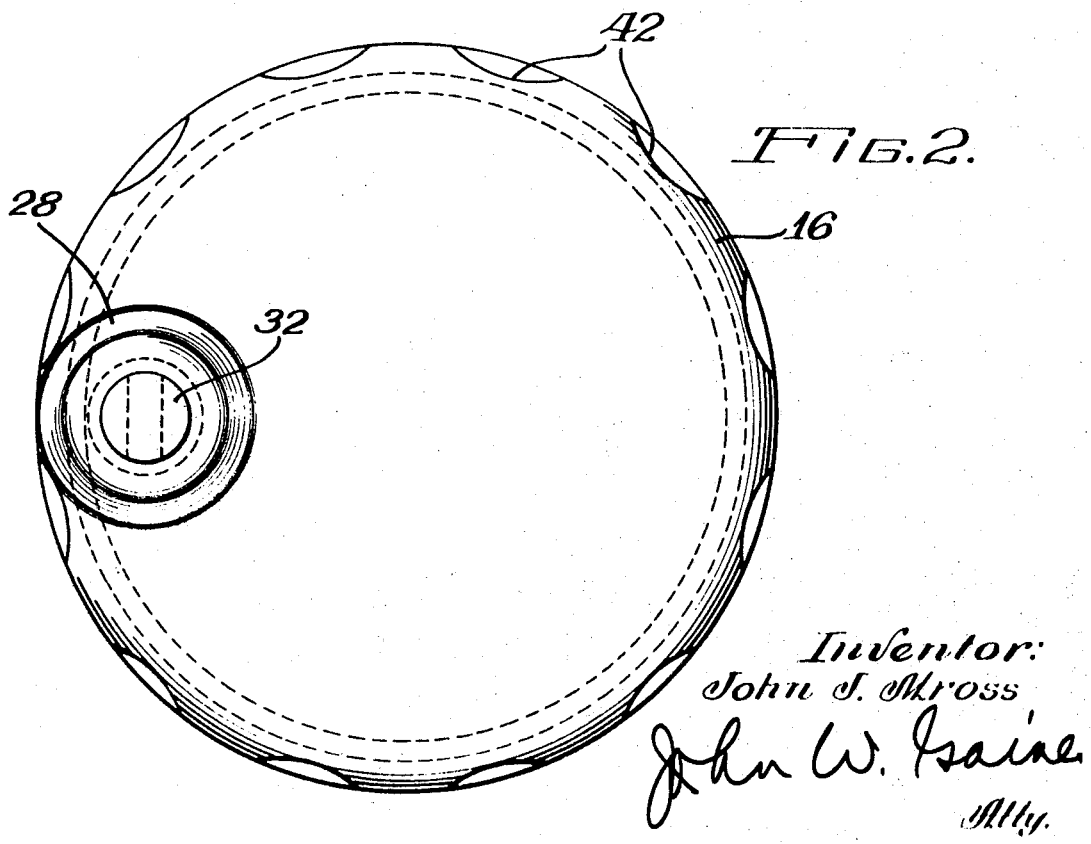
FIGS. 2 and 3 are respective top plan and exploded longitudinal elevational sectional views of the assembly, limited to showing only the external parts.
Figure 3:
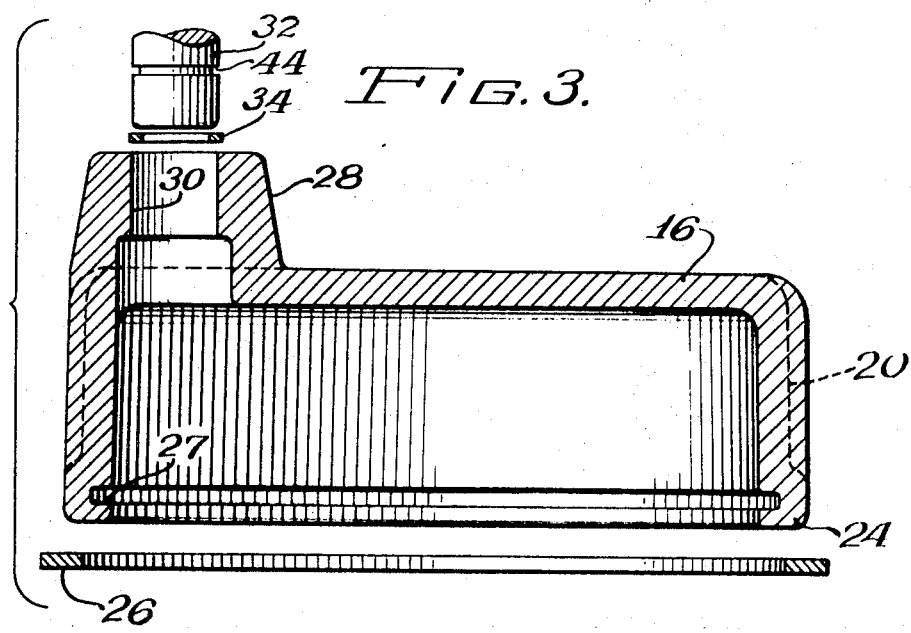

In the plan view of FIG. 2 and the exploded view of FIG. 3, the outer cap 16 is seen to have twelve finger scallops 42 arranged in 30° equal center to center spacing in a cylindrical ring thereabout.

The cap is assembled in a first stage by introducing the pin 32, with the snap ring 34 installed, upwardly into the guide boss 28 so that the snap ring 34 seats against the boss. In the last stage of assembly, the outer cap 16 (FIG. 3) is fitted over the filler cap, not shown, whereupon the snap ring 26 is inserted and thereafter allowed to expand and lockingly seat in the inside snap ring groove 27 in the mouth of the open end 24 of the cap 16.

Figure 4:
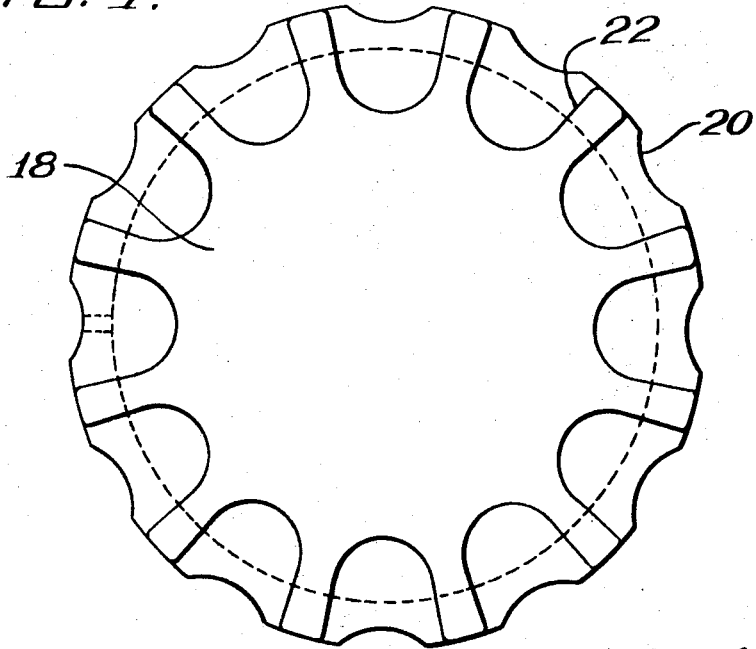

The filler cap 18, as shown in FIGS. 4 and 5, functions the same alone or in assembly. The scallops 22 and 20 of the respective upper and lower series for the fingers have the same 30° equal center to center spacing, have the same number twelve, and are arranged so that each scallop in a series intersects or registers vertically with a scallop in the other series. The rings of scallops cooperatively afford a good finger grip by the operator when the cap 18 is used alone, whereas the upper ring of scallops 22 is the only series used when the cap 18 is in assembly.

A ring gasket 48 carried in the cap 18 forms a compression seal transversely across the radially disposed end surface of the neck 12. Compression thereto from the cap is transmitted by an interengaged ball bearing 50 which is centrally staked in a blind opening in the underside of the cap 18 and a disc shaped imperforate plate 52 which, at the top center, engages the ball and which at the bottom outer periphery clamps down the gasket 48. The top of the filler cap 18 is intact all the way across, and the blind opening has a shallow depth confining it to the inner side of the top.

A radial vent opening 54 (FIG. 5) which is generally in the plane of the gasket 48 provides for timely venting of pressure from the tank, not shown, through the body of the cap 18 during the early part of and prior to completion of removal of the cap 18 from the neck 12.

The connection is made by pipe threads in the joint, the filler neck 12 carrying a set of external right-hand threads 56 and the mouth of the open end of the cap 18 carrying a mating set of internal threads 58. Other connections can equally well be used between the cap and neck, for instance, the well known lug type, quick disconnect joint requiring no more than a 180° turning when a fast means of disconnection is preferable.

In the modification as shown in FIG. 6, a cap assembly 110 on the filler neck 12 can be secured by a padlock 36 but removal is prevented in another manner.

External finger scallops 142 in an outer cap 116 of the assembly are arranged in a common cylindrical ring with and in alternation to a series of fingers or radial protrusions 143. The outer cap 116 has a smooth cylindrical internal surface 129 intersected by a longitudinally extending, keyway forming a semi-circular groove 130 depressed into the surface 129.

The groove 130 registers in radial alignment with a selected one of a series of keyway forming semi-circular scallops 120 arranged in a cylindrical ring externally about a filler cap 118 which is inside the outer cap 116. When the resulting circular, mutual keyway is unoccupied but blocked by a padlock in the storage, broken line positions as shown by the broken lines 36a, there is no way to establish drive between the relatively rotatable outer and filler caps 116 and 118 in the assembly, which therefore cannot be unscrewed from the neck 12. In such storage position the shackle of the padlock is received in a diagonal slot 140 which is confined to the upper outer edge of the cap 116 and intersects the groove 130 to define a common vertical plane.

In order to remove the assembly 110 for fueling the vehicle, the padlock 36 is removed and a key is inserted in the longitudinal keyway such as the straight free end of the U-shaped padlock shackle 37 which is shown in solid lines and is available when the padlock 36 is unlocked. The keyed together caps of the assembly 110 are thereafter conjointly rotated by hand until the sets of threads 158 respectively disengage and the assembly is removed from the neck 12. After fueling, a reverse order of steps, an unkeying, and a relocking follow so that the screwed-on assembly cannot be removed.

The other parts of the assembly 110 are the same as in the preceding embodiment, and will not be identified by reference numeral or by description.

It will be noted that the circular keyway formed by the groove 130 and the selected complementary scallop or groove 120 extends radially into the outer cap 116 to provide maximum leverage for introducing cap-applying torque and cap-removal torque to the filler cap 118. While a fourth part, namely, a separate pin, is omitted from the modification of FIG. 6, the user will nevertheless encounter the disadvantage that the padlock 36 is not locked in place on the assembly when the assembly has the drive connected.

The fact that the present assemblies are padlocked to prevent their unauthorized removal, means that non-functioning of the lock mechanism is remedied by the simple expedient of substituting a commercially available replacement padlock.

If the vehicle user loses his fuel tank cap, he has the choice to secure a replacement filler cap 18 or 118 either alone as a simple filler cap or in assembly as a disconnectible type fuel tank protector.

Variations within the spirit and scope of the invention described are equally comprehended by the foregoing description.

What is claimed is:
1. Filler cap for a fill neck having:
   a closed top;
   a body integral therewith and having an open end; and
   external, hand grip, scallop means intersecting the cap periphery comprising a lower series of scallops for the fingers arranged in a generally cylindrical ring, and an upper series of scallops for the fingers arranged in a generally radial ring in the plane of the top of the cap;
   the scallops of one ring each being in vertical registration with an individual scallop of the other ring.
2. The invention of claim 1, characterized by:
   a centered blind opening in the underside of the closed top;
   a clamping pressure transmitting ball bearing socketed in said blind opening; and
   interposed sealing means against which, under clamping pressure, the ball bearing bears and which, under the clamping pressure, is clamped against the fill neck to seal same.
3. The invention of claim 2, the body characterized by:
   means therein adjacent said open end for detachably connecting the cap to the fill neck; and
   a pressure vent opening generally behind the just said means passing transversely through said body.

References Cited

UNITED STATES PATENTS 3,477,607  11/1969  Fuzzell _____ 220—39
2,818,204  12/1957  Herchert et al. _____ 220—39 X GEORGE T. HALL, Primary Examiner U.S. Cl. X.R.

220—29, 44; 215—9